United States Patent [19]
McLendon

[11] Patent Number: 5,419,031
[45] Date of Patent: May 30, 1995

[54] ATTACHABLE GOLF CLUB GRIP FOR THE LAYMAN

[76] Inventor: Rob E. McLendon, P.O. Box 721295, Norman, Okla. 73070-4989

[21] Appl. No.: 122,689

[22] Filed: Sep. 17, 1993

[51] Int. Cl.$^6$ .................... B23P 11/02; A63B 53/14
[52] U.S. Cl. ................... 29/450; 273/81 R; 273/75; 29/235
[58] Field of Search ............... 273/73 R, 81 R, 81 D, 273/15, 81.2, 75, 26 B, 72 R; 29/450, 235

[56] References Cited

U.S. PATENT DOCUMENTS

| | | | |
|---|---|---|---|
| 1,488,901 | 4/1924 | Armstrong . | |
| 2,318,682 | 5/1943 | Fawick | 273/81 |
| 2,583,198 | 1/1952 | Axton | 273/81 R |
| 2,659,605 | 11/1953 | Tourneau | 273/72 R |
| 3,087,729 | 4/1963 | Sullivan | 273/81.5 |
| 3,606,326 | 9/1971 | Sparks et al. | 273/81 R |
| 3,614,100 | 10/1971 | Spitz | 273/72 R |
| 3,806,130 | 4/1974 | Jacques | 273/81.4 |
| 3,992,570 | 11/1976 | Beinhaur | 29/450 |
| 4,134,198 | 1/1979 | Briggs | 273/72 R |
| 4,185,375 | 1/1980 | Brown | 273/75 |
| 4,466,166 | 8/1984 | Hogarth | 273/75 |
| 4,506,430 | 3/1985 | Guzay | 29/450 |
| 4,685,189 | 8/1987 | Palmquist | 29/450 |
| 4,819,939 | 4/1989 | Kobayashi | 273/81 R |
| 4,878,667 | 11/1989 | Tosti | 273/81.2 |
| 4,912,836 | 4/1990 | Avetoom | 273/81 R |
| 5,034,082 | 7/1991 | Nolan | 273/75 |
| 5,258,088 | 11/1993 | Wu | 273/81 R |

FOREIGN PATENT DOCUMENTS

| | | | |
|---|---|---|---|
| 361349 | 11/1931 | United Kingdom . | |
| 2192550 | 1/1988 | United Kingdom | 273/81 R |

*Primary Examiner*—Sebastiano Passaniti

[57] ABSTRACT

A grip for a golf club which is completely self-contained with respect to attachment to a golf club shaft. A preformed, one-piece grip which requires no other tools, agents, equipment, or special expertise for application to a shaft. Once the grip is attached to the shaft, it is generally indistinguishable in appearance, feel, use, and permanence when compared to the one-piece, preformed grips currently in use. The grip's pre-attached, inside out state permits attachment to the golf club shaft by rolling the grip down over the shaft. In this manner, the one-piece, non-fissured structural integrity of the grip is maintained.

4 Claims, 11 Drawing Sheets

5,419,031

ATTACHABLE GOLF CLUB GRIP FOR THE LAYMAN

BACKGROUND-FIELD OF INVENTION

This invention relates to golf club grips, specifically to golf club grips which are one-piece, preformed, and are familiar to the public; but which can be attached by completely self-contained means without possessing expertise in the field of golf club grip attachment.

BACKGROUND-DESCRIPTION OF PRIOR ART

The most familiar and widely used of present-day golf club grips are composed of rubber or rubber-like materials. These grips are one-piece, hollow, preformed, and conical in appearance. The larger end is substantially or completely closed, while the smaller end is open and reveals the hollowness of the grip. The hollowness of the grip is mandatory so that the insertion of the golf club shaft into this aperture can occur. This described golf club grip is slipped onto a golf club shaft in a manner that requires an adhesive, such as two-way tape, and a petroleum-base agent, such as lighter fluid or the like.

The golf club shaft area that is to receive the golf club grip has the two-way tape or adhesive applied to the shaft area. Then, the petroleum-base agent is applied to the cavity of the grip and also poured over the tape. This procedure causes the adhesive and grip wall to become slick so that the bored small end of the golf club grip can be slipped over the top of the taped or adhesive-laden shaft. Then, the grip can be subsequently slipped down the shaft until the end of the shaft abuts against the covered or semi-covered end of the golf club grip. After the liquid petroleum-base agent evaporates, the golf club grip becomes permanently attached to the golf club shaft.

The above described attachment of a golf club grip involves specialized expertise, numerous materials, mess, and inconvenience. For these reasons, the majority of these grips are mounted on golf club shafts by skilled workers in golf shops as opposed to the layman who owns the golf clubs.

A replaceable, reusable golf club grip is shown in U.S. Pat. No. 4,878,667 to Tosti (1989). This grip, however, is foreign to the user's frame of familiarity with respect to traditional slip-on grips. One of the reasons for this unfamiliarity is that there is an observable and feelable seam extending longitudinally along the grip. Also, there is an observable slot built into this seam. Furthermore, the configuration of the grip is such that the longitudinal opening mandates a lack of structural integrity along the fissure where the two grip sides meet. Also, a lack of structural integrity is present in the hinge portion of the grip. Another drawback is that the grip is reusable and therefore lacks a permanent nature with respect to its attachment since this removing-intact aspect is fundamental to its design. This transitory feature of the invention is once again foreign and strange to a golfer's frame of familiarity. With regard to this grip, there is only frictional engagement of the grip with the shaft. There is no bonding adhesive agent between the two. This could cause an unstable bond between the two and slippage of the grip could result when the golf club is engaged.

A replaceable grip of a sort is also illustrated in U.S. Pat No. 4,819,939 to Kobayashi (1989). This grip is a two-piece grip as opposed to a one-piece grip. There is no ease of attachment with regard to the application of the base part of the grip to the golf club shaft. The layman would be hard pressed to accomplish this base unit attachment. Also, there is no ease of attachment with regard to the grip's outer layer upon the grip's inner layer. This two-piece grip was not developed for ease of application to the shaft, but rather it was concerned with golf club grip weight.

OBJECTS AND ADVANTAGES

Accordingly, several objects and advantages of the present invention are:
(a) no other outside tools or agents necessary to attach this grip;
(b) no mess or untidiness related to the using of petroleum-base or like agents which facilitate slipping the grip over the shaft;
(c) in-place grip, after attachment to the golf club shaft, is virtually indistinguishably different from the most commonly used one-piece, preformed grips in use at the present time;
(d) no special expertise needed to attach the grip;
(e) no observable or feelable seam or slot in the grip;
(f) bonding agent contained on the grip to more securely bond the grip to the shaft;
(g) grip is one-piece, hence, there is no other piece or mechanism to attach to the golf club shaft;
(h) no fastening structures needed within/on the grip which must dock for secure closure around the golf club shaft;
(i) grip has uniform structural integrity since there are no fissures or hinges to compromise the structure;
(j) because no liquid agent is used to slick the entire grip wall and shaft, there is virtually no wait for the grip to bond to the shaft.

Further objects and advantages of this invention will become apparent from the accompanying drawings and ensuing descriptions of the embodiments of this invention.

DRAWING FIGURES

Figure 1:
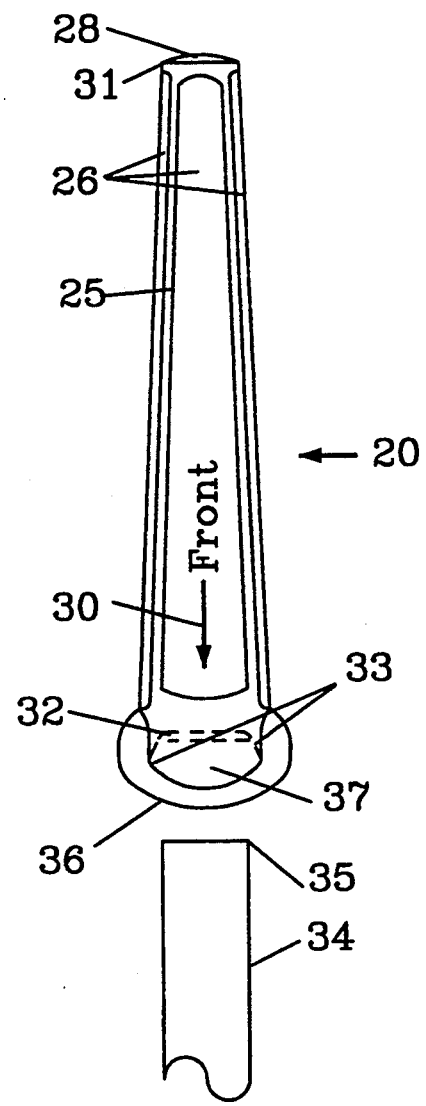
FIG. 1 is a view illustrating a first embodiment of the front of the golf club grip according to the present invention as it is viewed before it is placed on the golf club shaft, illustrating the slickened wall area.

REFERENCE NUMERALS IN DRAWINGS 20 golf club grip
24 affixing agent
25 grip wall
26 paper
28 hollow
30 arrow
31 distal end of the grip
32 butt end of the grip
33 slickened wall area
34 golf club shaft
35 proximal end of the shaft
36 fold
37 grip aperture
39 grip surface
42 suction cups
44 grip wall recesses

DESCRIPTION-FIGS. 1 THROUGH 6

Figure 1A:
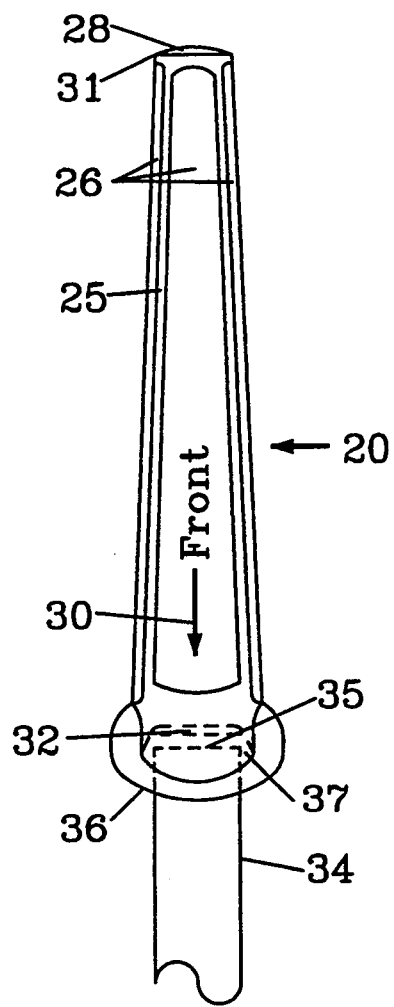
FIG. 1A is a view of the golf club grip of FIG. 1 as it appears being initially placed on the golf club shaft showing the paper protecting and covering the adhesive.

Referring to the drawings, FIG. 1 illustrates the front of a golf club grip 20 as it appears before being operationally attached to a golf club shaft 34. The composition of the grip is of predetermined elasticity which is sufficient to promote a fold 36. Fold 36 is formed by the juncture of a grip wall 25 which is of predetermined thickness on the outside of the grip with a continuation of grip wall 25 on the inside of the grip. Fold 36 is located as close to a butt end of the grip 32 as the thickness and elasticity of grip wall 25 permits. A slickened wall area 33 is on the sides of a grip aperture 37. Aperture 37 will be the initial host of a proximal end of the shaft 35. Referring to FIG. 1A, proximal end of the shaft 35 is shown in phantom within grip aperture 37. Fold 36 completely encompasses proximal end of the shaft 35.

Figure 1B:
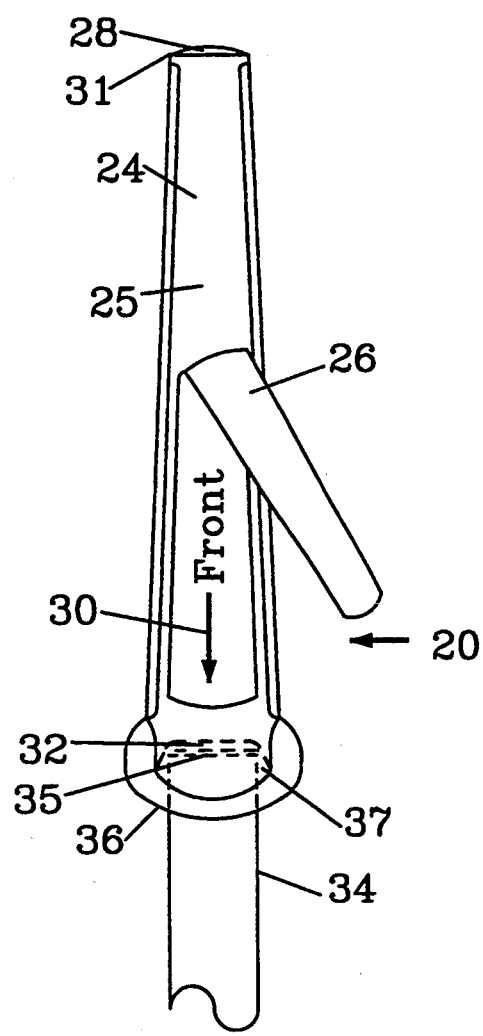
FIG. 1B is a front view of the golf club grip as it appears initially placed on the golf club shaft with the paper covering the adhesive area partially peeled away.
Figure 2:
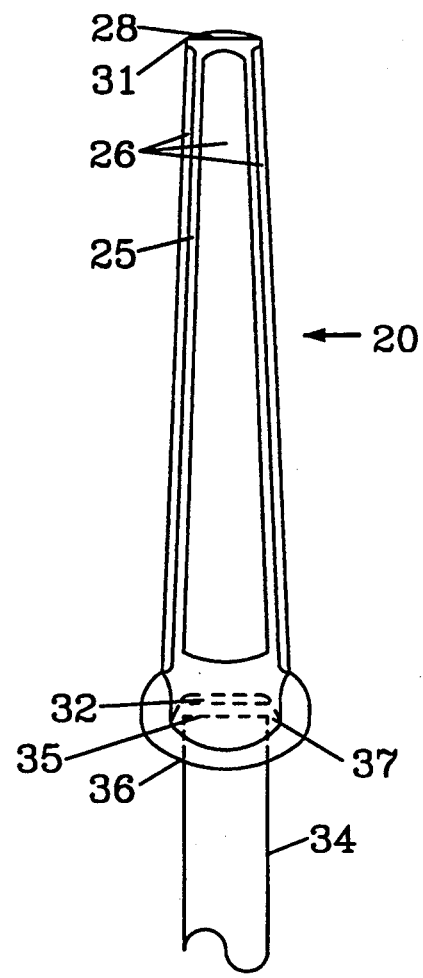
FIG. 2 is a back view of the golf club grip of FIG. 1 being initially placed on the golf club shaft.

Referring to FIG. 1B, there is a predetermined area covered by an affixing agent 24 on grip wall 25. In this initial embodiment, affixing agent 24 is an adhesive substance. This adhesive substance is covered and protected by a paper 26 on grip wall 25. Paper 26 has an arrow 30 which denotes the front of golf club grip 20 (which otherwise would not be apparent because of the inside out status of the grip). A hollow 28 is formed by the inside out position of the grip. FIG. 2 depicts the back view of golf club grip 20. This view illustrates the only difference between the back and front views of golf club grip 20 is arrow 30 denoting the front part of the grip.

Figure 3:
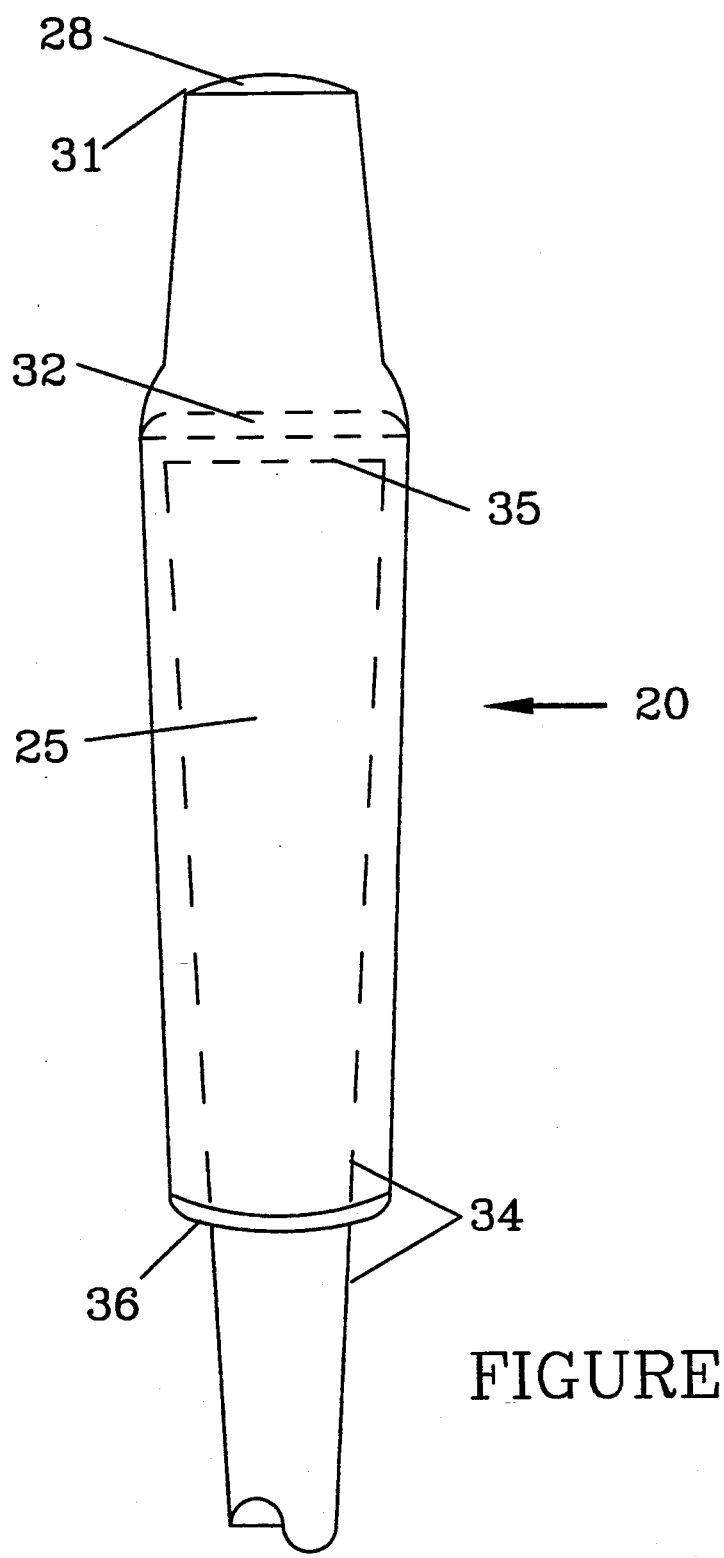
FIG. 3 is a view of the grip being rolled down over the shaft, with that portion of the grip-covered shaft appearing in phantom, as well as, the butt end of the grip appearing in phantom.

Referring now to FIG. 3, fold 36 has moved away from proximal end of the shaft 35. Fold 36 in FIG. 3 is less bulky than corresponding fold 36 in FIGS. 1, 1A, and 2 because grip wall 25 is thinner running toward hollow 28.

Figure 4:
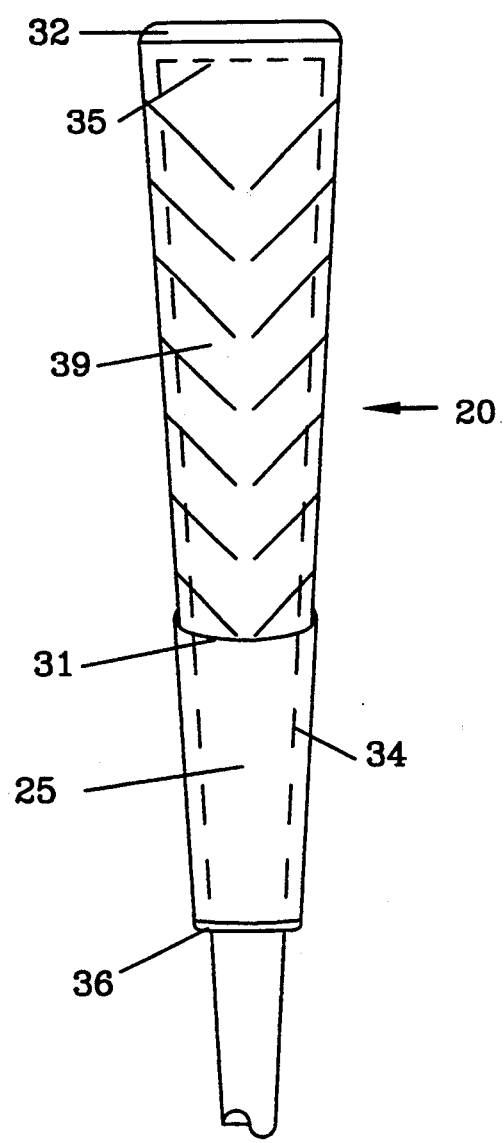
FIG. 4 is a view much like FIG. 3 of the grip continuing to be rolled downward over the shaft, but the, now, outside butt end of the grip has emerged and the soon-to-be distal end of the grip is illustrated as approximately in the middle of the golf club grip.
Figure 5:
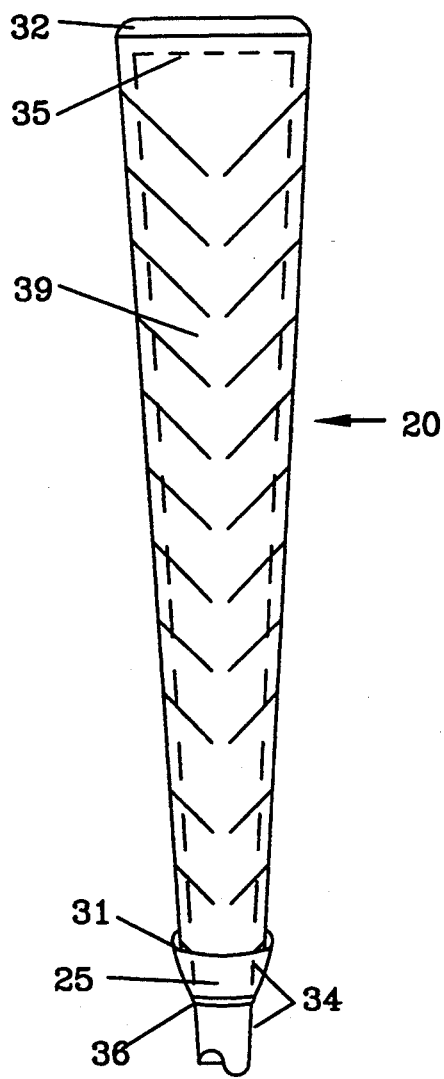
FIG. 5 is a view like that of FIG. 3 and FIG. 4 in that the grip is continuing to be rolled downward over the shaft and the soon-to-be distal end of the grip is shown near its ultimate destination.

A grip surface 39 emerges in FIGS. 4 and 5. A soon-to-be distal end of the grip 31 hugs grip surface 39.

Figure 6:
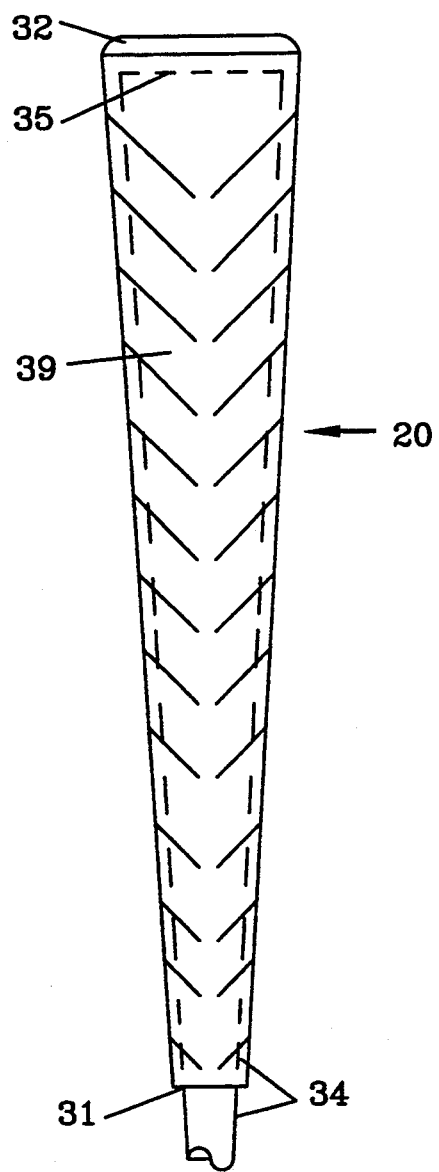
FIG. 6 is a front view of the golf club grip as it appears after it has been completely rolled down the golf club shaft.

Referring now to FIG. 6, golf club grip 20 is completely unfurled over, and attached to, golf club shaft 34. Golf club shaft 34 is shown in phantom in relation to the grip.

OPERATION

Installation of golf club grip 20 is achieved by positioning the grip above golf club shaft 34 with arrow 30 pointing down the front of the shaft as depicted in FIG. 1. Grip aperture 37 faces proximal end of the shaft 35. Slickened wall area 33 of grip aperture 37 causes a retardation of friction between the grip and shaft in order to facilitate insertion of proximal end of the shaft 35 into grip aperture 37. Fold 36 encompasses the shaft as illustrated in FIGS. 1A-2. In FIG. 1B, paper 26, which covers and protects affixing agent 24, is partially peeled away from the adhesive on grip wall 25.

Pressure is applied to the grip such that fold 36 is moved down golf club shaft 34 as illustrated in FIGS. 3-5. In FIG. 3, fold 36 is located farther from proximal end of the shaft 35 as compared to FIGS. 1A-2.

The ease of movement of grip wall 25 past butt end of the grip 32 results from the composition and elasticity of the grip. The grip is composed of rubber or material with rubber-like properties.

FIG. 4 is a result of continuing pressure exerted toward fold 36. Fold 36 has moved farther away from proximal end of the shaft 35 when compared to FIGS. 1-3. Grip surface 39 has emerged for the first time. This emergence is the result of eventual distal end of the grip 31 of FIG. 3 moving over and past butt end of the grip 32 of golf club grip 20.

The front view of the grip in FIG. 5 represents a continuing movement of fold 36 down and away from proximal end of the shaft 35. More of grip surface 39, as compared to FIGS. 3 and 4, is apparent. The soon-to-be distal end of the grip 31 hugs grip surface 39. A portion of grip wall 25 is still visible in FIG. 5.

Referring now to FIG. 6, distal end of the grip 31 has reached its ultimate destination. All of grip surface 39 is now visible. No grip wall 25 is now apparent. Golf club shaft 34 is depicted in phantom being encompassed by golf club grip 20.

Figure 7:
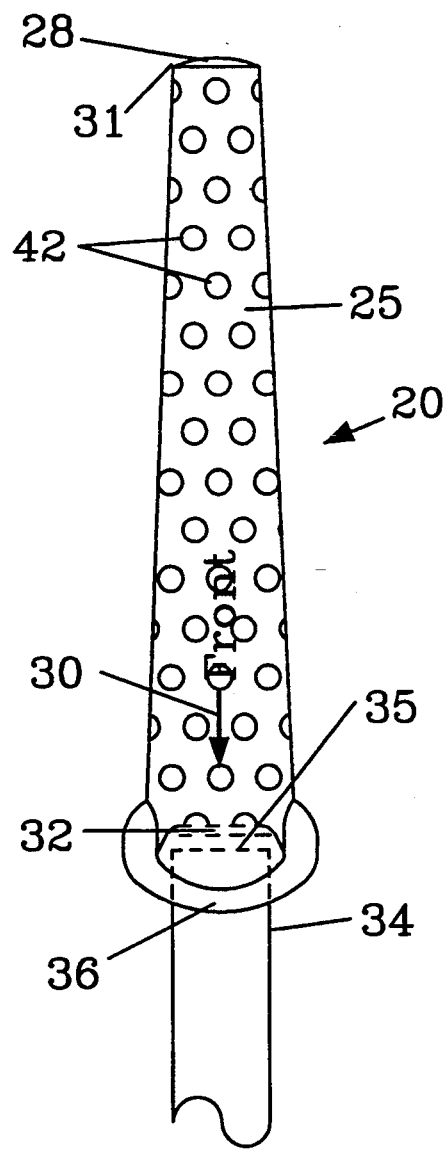
FIG. 7 is a view, as in FIG. 1A, illustrating a second embodiment of the invention; instead of paper covering the adhesive on the grip, small suction cups or ribs (not shown here) provide the adhesive engagement for binding the grip to the shaft.

An alternative embodiment of the invention is illustrated in FIG. 7 which shows a front view of the grip. Instead of the adhesive material covered by paper 26 referred to in the primary embodiment of the grip, there are a number of small pockets or suction cups 42 located on grip wall 25 to enhance the stability of the grip in relation to golf club shaft 34. There could also be simply a rough grip wall or smooth grip wall (neither of which is shown here) with no adhesive to replace the adhesive areas referred to in the first embodiment of the grip.

Figure 8:
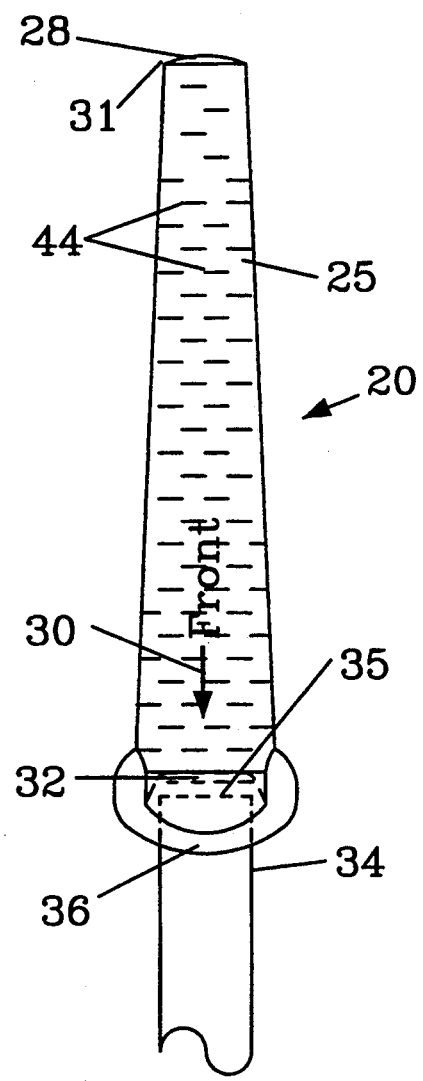
FIG. 8 is a view, as in FIG. 1A, illustrating another embodiment of the invention; small recesses on the grip wall facilitate the rolling downward of the grip over the shaft.

Another embodiment of the invention is shown in FIG. 8 which shows a front view of golf club grip 20. This embodiment reflects a number of thinner sections or grip wall recesses 44 on grip wall 25 arranged in a predetermined manner to facilitate grip elasticity and frictional bonding with the shaft.

Figure 9:
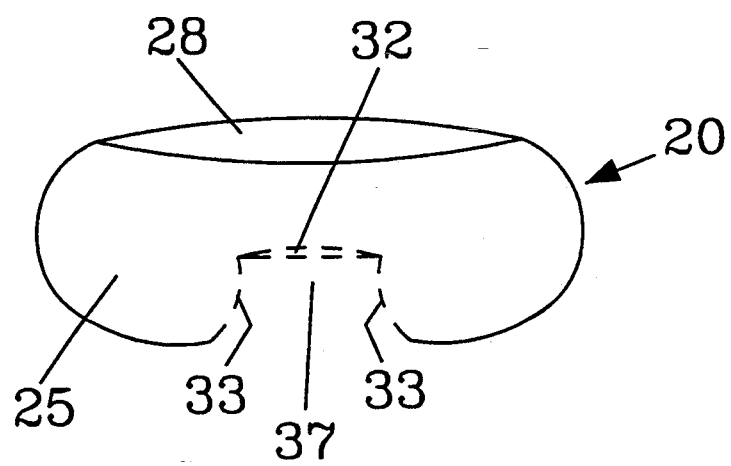
FIG. 9 illustrates another embodiment of the invention from a side-view perspective; instead of the grip wall extending longitudinally above the butt end of the grip, it is rolled into a convolute shape.

Another embodiment of the invention is shown in FIG. 9. This drawing is a side view of golf club grip 20 before it is applied to a shaft. Instead of grip wall 25 extending longitudinally above butt end of the grip 32, grip wall 25 is rolled into a convolute shape.

CONCLUSION, RAMIFICATIONS, AND SCOPE

The golf club grip of the invention, once it has been attached to the shaft, is alike in appearance, feel, use, and permanence when compared to those one-piece, preformed grips now popular among golfers and others. There is no need to familiarize the golfer with another type of grip. This described golf club grip is still a one-piece, unfissured, and permanent preformed grip which is familiar and acceptable to the golfer's frame of reference. The difference in this preformed grip is in its predilection for attachment to the golf club shaft. No other equipment, agents, or special expertise is required to attach the grip. Hence, there is no mess, inconvenience, or delay in the grip-attachment process. The grip can be easily attached by a layman. In the conventional method of attaching a one-piece, preformed grip to a golf club shaft, a liquid agent is extensively used. Since a liquid agent is not extensively used in conjunction with this newly invented grip, there is no appreciable time involved in waiting for the grip to dry and bond to the shaft.

The foregoing description contains specificities that should not be construed as limiting the scope of the invention. The detail provided should serve as exemplifications of the preferred embodiments. Many other variations are possible. The scope of the invention is determined not by the illustrated embodiments, but by the following claims and their legal equivalents.

I Claim:

1. A method for attaching a one-piece, preformed golf club grip directly to an outer surface of a golf club shaft, comprising the steps of:
   (a) positioning a grip aperture above a proximal end of an uncovered golf club shaft;
   (b) inserting said proximal end of said uncovered golf club shaft into said grip aperture so that a fold, created by a juncture of an outside facing on a grip wall with a continuation of said facing leading to an inside of a butt end of said golf club grip, envelops said proximal end of said uncovered golf club shaft;
   (c) applying force upon said fold so that said fold unrolls over said uncovered golf club shaft and away from said proximal end of said golf club shaft; concurrently, a hollow of said golf club grip is progressively filled by said golf club shaft, which is now covered by said golf club grip, until an after-fully-attached distal end of said golf club grip encloses said butt end of said golf club grip eclipsing said hollow; at this point, said after-fully-attached distal end of said golf club grip passes said butt end of said golf club grip and continues moving in a direction that is away from said proximal end of said golf club shaft; said after-fully-attached distal end of said golf club grip hugs a grip surface of said grip wall;
   (d) continuing to apply force upon said fold until said fold is extinguished because all of said facing of said grip wall is directly against an outer surface of said golf club shaft; said grip surface of said grip wall is now wholly visible wherein before attaching said golf club grip to said uncovered golf club shaft only said facing of said grip wall and said fold were visible;
   (e) said distal end of said golf club grip is now, after being fully attached to said golf club shaft, at its farthest possible point from said proximal end of said golf club shaft.

2. The method for attaching said one-piece, preformed golf club grip of claim 1 to said uncovered golf club shaft whereby force is applied from a position above said fold, by said grip wall being grasped and subsequently pushed down and away from said proximal end of said golf club shaft while, at the same time, said fold movement causes said formerly uncovered golf club shaft to be covered by said golf club grip.

3. The method for attaching said one-piece, preformed golf club grip of claim 1 to said uncovered golf club shaft whereby force is applied from a position below said fold, by said grip wall being grasped and subsequently pulled down and away from said proximal end of said golf club shaft while, at the same time, said fold movement causes said formerly uncovered golf club shaft to be covered by said golf club grip.

4. The method for attaching said one-piece, preformed golf club grip of claim 1 to said uncovered golf club shaft whereby force is applied from a position adjacent and approximately parallel to said fold, by said grip wall being grasped and moved in a direction which is down and away from said proximal end of said golf club shaft while, at the same time, said fold movement causes said formerly uncovered golf club shaft to be covered by said golf club grip.

* * * * *